（12）United States Patent
Gormley (10) Patent No.: US 7,203,670 B2
(45) Date of Patent: Apr. 10, 2007

(54) METHOD AND SYSTEM FOR MAINTAINING ENHANCED FILE AVAILABILITY (75) Inventor: Steven J. Gormley, Papillion, NE (US)

(73) Assignee: First Data Corporation, Greenwood Village, CO (US)

( * ) Notice: Subject to any disclaimer, the term of this patent is extended or adjusted under 35 U.S.C. 154(b) by 1021 days.

(21) Appl. No.: 10/116,676

(22) Filed: Apr. 4, 2002

(65) Prior Publication Data
US 2003/0191735 A1 Oct. 9, 2003

(51) Int. Cl.
G06F 7/00 (2006.01)
(52) U.S. Cl. .............................................. 707/2; 707/1
(58) Field of Classification Search ................ 235/380, 235/379, 375–376, 435, 439; 379/91.01, 379/90.111, 114.1, 114.01; 705/44, 1, 35, 705/38–42, 22, 16–18, 50, 64–66; 902/37, 902/39; 707/1–104.1, 200–205
See application file for complete search history.

(56) References Cited

U.S. PATENT DOCUMENTS

| 5,530,848 | A | * | 6/1996 | Gilbert et al. | 719/313 |
| 5,659,736 | A | * | 8/1997 | Hasegawa et al. | 707/100 |
| 5,675,802 | A | * | 10/1997 | Allen et al. | 717/103 |
| 5,887,274 | A | * | 3/1999 | Barry et al. | 707/202 |
| 5,897,638 | A | * | 4/1999 | Lasser et al. | 707/102 |
| 6,622,176 | B2 | * | 9/2003 | Jones et al. | 719/328 |
| 6,651,884 | B2 | | 11/2003 | Prendergast et al. | |
| 2002/0112008 | A1 | * | 8/2002 | Christenson et al. | |
| 2003/0183687 | A1 | | 10/2003 | Hogan et al. | |
| 2003/0187781 | A1 | | 10/2003 | Goodman et al. | |
| 2004/0215709 | A1 | * | 10/2004 | Basani et al. | 709/201 |

FOREIGN PATENT DOCUMENTS

JP 404268921 A * 9/2002

OTHER PUBLICATIONS

Jean E. Sammet, "Basic Elements of COBOL 61", Communicatins of the ACM, pp. 237-253.*

* cited by examiner

Primary Examiner—Leslie Wong
Assistant Examiner—Linh Black
(74) Attorney, Agent, or Firm—Townsend and Townsend and Crew LLP (57) ABSTRACT A method and system for enhancing the availability of VSAM files is provided. According to one exemplary method performed by a batch program, a '1' file is accessible to the online regions during a business day and a '2' file is built with updated information. Online traffic is switched from the '1' file to the '2' file. The '1' file is then locked up to prevent access by other batch programs. The '1' file is then renamed to '3' to free up the '1' dataset name. The '3' file (which was the old '1' file before it was renamed) is opened and online traffic is switched from the '2' file to the '3' file. Next, the '2' file is locked up to similarly prevent access by other batch programs. The '2' file is then renamed to '1'. The '1' file (which is the original '2' file before it was renamed) is opened and online traffic is switched from the '3' file to the '1' file. Likewise, the '3' file is locked up to prevent any further access by other batch programs. Finally, the '3' file is renamed to '2' thereby making this file available for the batch process to build the '2' file with updated information during the next cycle.

20 Claims, 11 Drawing Sheets

| | 4290 | 4300 | 4310 | 4320 | 4330 | 4340 |
|---|---|---|---|---|---|---|
| Batch | Sequentially DPL to Online(s) to switch traffic | Start FS3A and begin polling | Polling | Close EXCI STEP TERMINATION | FDRCHKDS obtains exclusive control of '3' files | IDCAMS Rename '3' files to '2' |
| Online Task | FS3S 'Phase 3 Switch' processing | Attach FS3A Return ID to batch | FS3A 'Phase 3 After' processing | | | |
| Online FCTs | Primary FCT / Alternate FCT → New Data '1' | Primary FCT / Alternate FCT → New Data '1' | Primary FCT / Alternate FCT → New Data '1' | Primary FCT / Alternate FCT → New Data '1' | Primary FCT / Alternate FCT → New Data '1' | Primary FCT / Alternate FCT → New Data '1' |
| Physical Files | Old Data '3' | Old Data '3' | Old Data '3' | Old Data '3' | Old Data '3' | Old Data '2' |
| Description | • Batch sequentially DPLs to each Online to switch it's work to the new file.<br>• Each online changes it's pointer to the active FCT<br>• Each online calls the Application support module (if defined) for any 'switch' work it deems necessary<br>• Online(s) stop tracking first file references | • DPL to Online(s) to start 'Phase 3 After' work under transactions FS3A<br>• Receive task ID back from each Online<br>• Begin polling for completion of FS3A tasks | • For Each Online Region:<br>• Locate FileGroup's Status Block<br>• Wait for completion of any in-flight tasks that have made requests against the old files<br>• Call Application support module (if defined) for any Phase 3 After work it deems necessary<br>• Close the old files<br>• Set old FCT's DSN=DUMMY<br>• Post response for Batch | • Terminate EXCI communication with Online(s)<br>• Close batch files<br>• Close Online Log message facility<br>• Return to MVS to terminate Jobstep | • Build table of '3' file DSNs<br>• Conditionally allocate DISP=OLD via SVC 99<br>• If unavailable on first attempt, issue informational WTO to console.<br>• Repeat at one second intervals until all files have been allocated DISP=OLD | • Rename the '3' files to '2'<br>(Last of three renames) |

METHOD AND SYSTEM FOR MAINTAINING ENHANCED FILE AVAILABILITY

BACKGROUND OF THE INVENTION

The present invention generally relates to file management. More specifically, the present invention relates to enhancing availability of VSAM files.

A large number of companies continue to utilize mainframe systems within their information technology or computing infrastructures. The continuing existence of mainframe systems may be attributed to a number of factors. For example, the pervasive entrenchment of mainframe systems before the advent of client/server computing architecture makes it difficult to completely eliminate use of mainframe systems. Furthermore, in certain respects, mainframe systems are more efficient and cost-effective. For instance, mainframe systems, in general, are better equipped to handle batch processing and data processing intensive applications.

One common file management system that is used in connection with a mainframe system is called Virtual Storage Access Method (VSAM). VSAM is a system available from International Business Machines Corp. (IBM). Using VSAM, a company can create and access records in a file in the sequential order that they were entered. Each record can also be saved and accessed with a key, such as, the name of an employee.

In order to access and manage VSAM files online, an online transaction processing program (OTPP) is typically used. One such OTPP is called Customer Information Control System (CICS) which is also available from IBM. Generally, online regions or systems having capabilities to handle VSAM files online operate in the following manner. The online regions read and/or update the VSAM files throughout the course of a business day. At the end of the day, batch procedures are executed to process the data collected during the day. One of the outputs of this batch processing is updated information to be placed on the VSAM files to be used for the next business day.

Because a VSAM file needs to be closed to the online regions while it is being loaded, how each online region goes about getting the updated information into the VSAM files depends on the volume of information and a given online region's availability requirements. A number of approaches are generally used to update the VSAM files. In one approach, the VSAM files that are to be updated are completely closed to the online regions. Batch processes are then run directly against the closed VSAM files. Once the batch processes are completed, the updated VSAM files are made available to the online regions again. This method leaves the VSAM files unavailable to the online regions for the entire duration of the batch processes, which could potentially mean hours of unavailability.

In a second approach, a batch process is executed to build sequential files of data to be loaded into the VSAM files. The VSAM files that are to be updated are then closed to the online regions. The closed VSAM files are then loaded or updated from the sequential files. The updated VSAM files are then reopened to the online regions. This approach provides relatively higher availability than the approach mentioned above, since the VSAM files are only closed while the loads or updates run.

In a third approach, a batch process is executed to load the updated information directly to a second set of VSAM files. The VSAM files that are to be updated are then closed to the online regions. The original VSAM files and the second set of VSAM files are then renamed. The purpose of the rename process is to switch the corresponding identities of the VSAM files. By renaming the VSAM files, the second set of VSAM files (now renamed) are now available the online regions. As a result, the amount of unavailable time is reduced.

Figure 1:
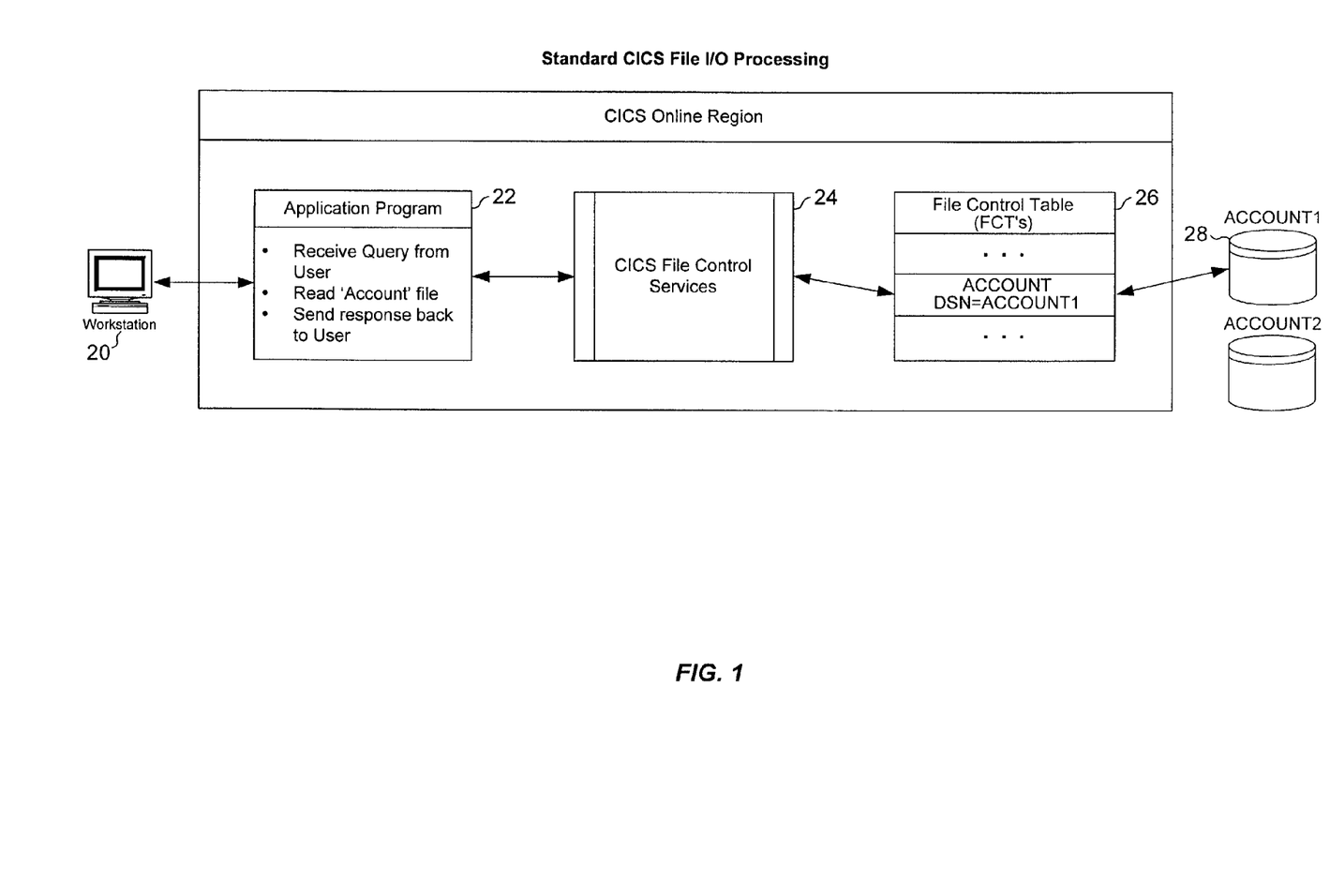
FIG. 1 is a simplified block diagram illustrating the conventional input/output process of an online region for accessing a file.

FIG. 1 is a simplified block diagram illustrating the conventional input/output process of an online region for accessing a file. As shown in FIG. 1, a workstation 20 interacts with an application program 22 within an online region to request the application program 22 to retrieve a specific record from a file 28. In turn, the application program 22 asks a file control module 24 to identify the file control table 26 that has information on the file 28 containing the desired record. The file control module 24 locates the file control table 26 and uses information from the file control table 26 to read the desired record from the file 28. The file control module 24 then returns the desired record to the application program 22 which, then, relays the desired record to the workstation 20.

Figure 2:
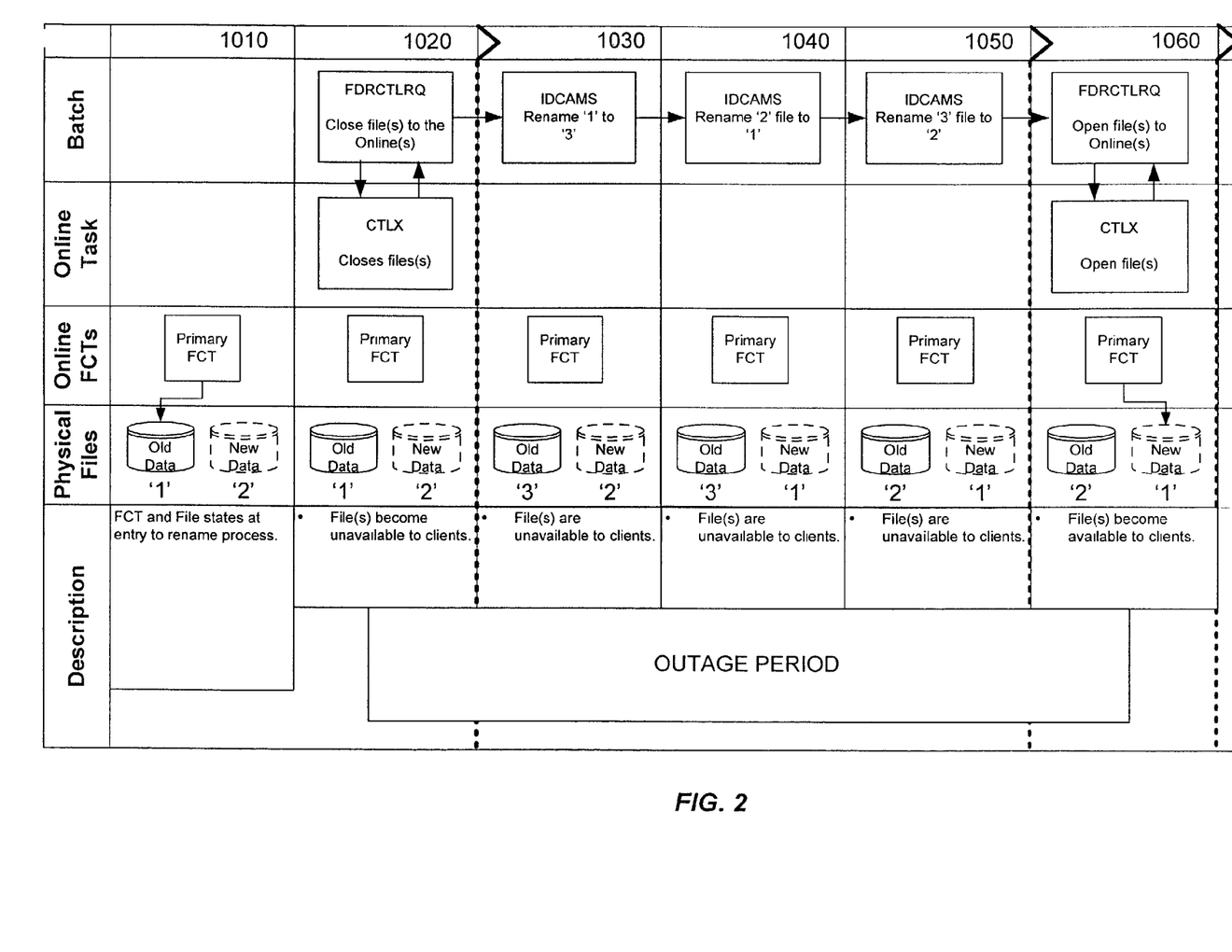
FIG. 2 is a simplified flow diagram illustrating a conventional approach used in updating a VSAM file.

FIG. 2 is a simplified flow diagram illustrating the third approach in more detail. Referring to FIG. 2, it should be understood that VSAM terminology are being used in connection with FIG. 2. A 1/2/3 naming standard is used, referring to a single character within the dataset name of the VSAM file. The '1' file is the dataset that is available to the online regions throughout the business day, i.e., the file that has the designation or name '1' is the dataset that is available to the online regions. The '2' file is the one that the batch process rebuilds with the updated information at night. During the rename process, the original '1' file is renamed to '3' to free up the '1' dataset name for the subsequent rename. All rename operations may be performed with the standard IBM VSAM utility program IDCAMS.

As illustrated in FIG. 2, at 1010, the '1' file is accessible to the online regions during a business day. At 1020, in preparation for the rename operation, the current '1' file is closed to the online regions after the '2' file has been built with updated information. At 1030, the '1' file is renamed to '3' to free up the '1' dataset name. At 1040, the '2' file is renamed to '1' thereby making it accessible to the online regions for the upcoming business day. At 1050, the '3' file (which is the original '1' file before it was renamed) is renamed to '2' thereby making this file available for the batch process to build the '2' file with updated information during the next cycle. At 1060, the '1' file (which is the original '2' file before it was renamed) is opened and made accessible to the online regions.

As described above, the conventional approaches currently used to update VSAM files still require a certain amount of downtime or unavailability time. Hence, it would be desirable to provide a method and system that is capable of further enhancing availability of VSAM files.

SUMMARY OF THE INVENTION

A method and system for enhancing the availability of VSAM files is provided. According to one exemplary method, a '1' file is accessible to the online regions during a business day and a '2' file is built with updated information. Online traffic is switched from the '1' file to the '2' file. The '1' file is then locked up to prevent access by other batch programs. The '1' file is then renamed to '3' to free up the '1' dataset name. The '3' file (which was the old '1' file before it was renamed) is opened and online traffic is switched from the '2' file to the '3' file. Next, the '2' file is locked up to similarly prevent access by other batch programs. The '2' file is then renamed to '1'. The '1' file (which is the original '2' file before it was renamed) is opened and online traffic is switched from the '3' file to the '1' file. Likewise, the '3' file is locked up to prevent any further access by other batch programs. Finally, the '3' file is renamed to '2' thereby making this file available for the batch process to build the '2' file with updated information during the next cycle.

From another perspective, the exemplary process can be viewed as follows. Initially, a first file having a first dataset name is accessible to the online regions during a business day and a second file having a second dataset name is built with updated information. Online traffic is then switched from the first file to the second file. Next, the first file is renamed to have a third dataset name thereby freeing up the first dataset name. The first file now having the third dataset name is opened and online traffic is switched from the second file having the second dataset name to the first file having the third dataset name. In addition, the second file having the second dataset name is closed to the online regions. Then, the second file is renamed to have the first dataset name. The renamed second file (now having the first dataset name) is opened and online traffic is switched from the first file having the third dataset name to the renamed second file. Finally, the first file having the third dataset name is renamed using the second dataset name thereby making this file available for the batch process to build a file with updated information during the next cycle.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIGS. 4a–e are simplified flow diagrams illustrating in further details the exemplary process as shown in FIGS. 3a–b in accordance with the present invention;

DETAILED DESCRIPTION OF THE INVENTION

The present invention in the form of one or more exemplary embodiments will now be described. An exemplary embodiment of the present invention is a system implemented using VSAM files and CICS from IBM. In order to understand the terminology used herein, Table 1 below provides a glossary of terms.

Table 1

(1) Alias FCT—Eight character FCT name used by application programs to access a given file on a read-only basis. Any file processed via an Alias FCT will also have a Primary FCT in another CICS region.

(2) Alternate FCT—Eight character FCT name used internally by the present invention to enable access to both physical datasets concurrently during a switch operation. There is a one for one pairing of an Alternate FCT entry for every Primary and Alias FCT entry. The Alternate FCT is identical to the Primary/Alias FCTs except that the application code is unaware of its existence except for the Application Support module (if one is defined for the FileGroup).

(3) Application Support Module (ASM)—An application module that is passed control at various points in the exemplary process of the present invention to perform any work it deems necessary on behalf of the application subsystem. Examples would include building/swapping split point tables, performing catch-up processing on files being switched to, etc.

(4) CICS—Customer Information Control System. An Online Transaction Processing system from IBM.

(5) Dataset—Logically a synonym for 'file' as used herein.

(6) Dataset Name (DSN)—A 44-character name uniquely identifying a file in an MVS or OS/390 operating system.

(7) DDTE—DDname Table Entry. A control block within the system of the present invention (one per Primary or Alias DDname) used to control which FCT a given I/O requested is directed to.

(8) FCT—File Control Table. A definition within a CICS system of an eight character name representing a file that can be accessed by programs within the CICS system. The FCT contains the real dataset name of the file, and other information used to control access to the file.

(9) FDRCHKDS—A system program of the present invention designed to acquire exclusive control of one or more datasets. This system program is usually used prior to a dataset rename to make sure no other batch job is using the datasets, which would cause the rename to fail.

(10) FDRCTLRQ—Old style control system batch module used to request file opens and closes in the online regions.

(11) FDRFSBSC—The batch component of the system of the present invention. Its purpose is to initiate and coordinate the actions of all online regions using the files within a FileGroup during a switch operation.

(12) FileGroup—A collection of files within the system of the present invention that are treated as a single entity (in terms of access by the online regions, being built and renamed by batch, etc.)

(13) FileGroup Status Block (FSB)—A control block within the system of the present invention used to associate information pertaining to a given FileGroup.

(14) IDCAMS—Access Method Services batch utility module which is supplied by IBM to manage VSAM datasets.

(15) Primary FCT—Eight character FCT entry name used by CICS application programs to access a given file.

(16) VSAM—Virtual Storage Access Method. One of two file structure formats (Access Methods) accessed directly by CICS.

According to an exemplary embodiment of the present invention, the system provides uninterrupted online access by CICS transactions to VSAM datasets during times when such datasets would be unavailable using standard IBM facilities; more specifically, during the time a file is being replaced with an updated version. As will be further described below, the system allows one of two sets of files to be open to the online regions during the entire duration of the rename process. As a result, data is always available to the online regions.

Figure 3A:
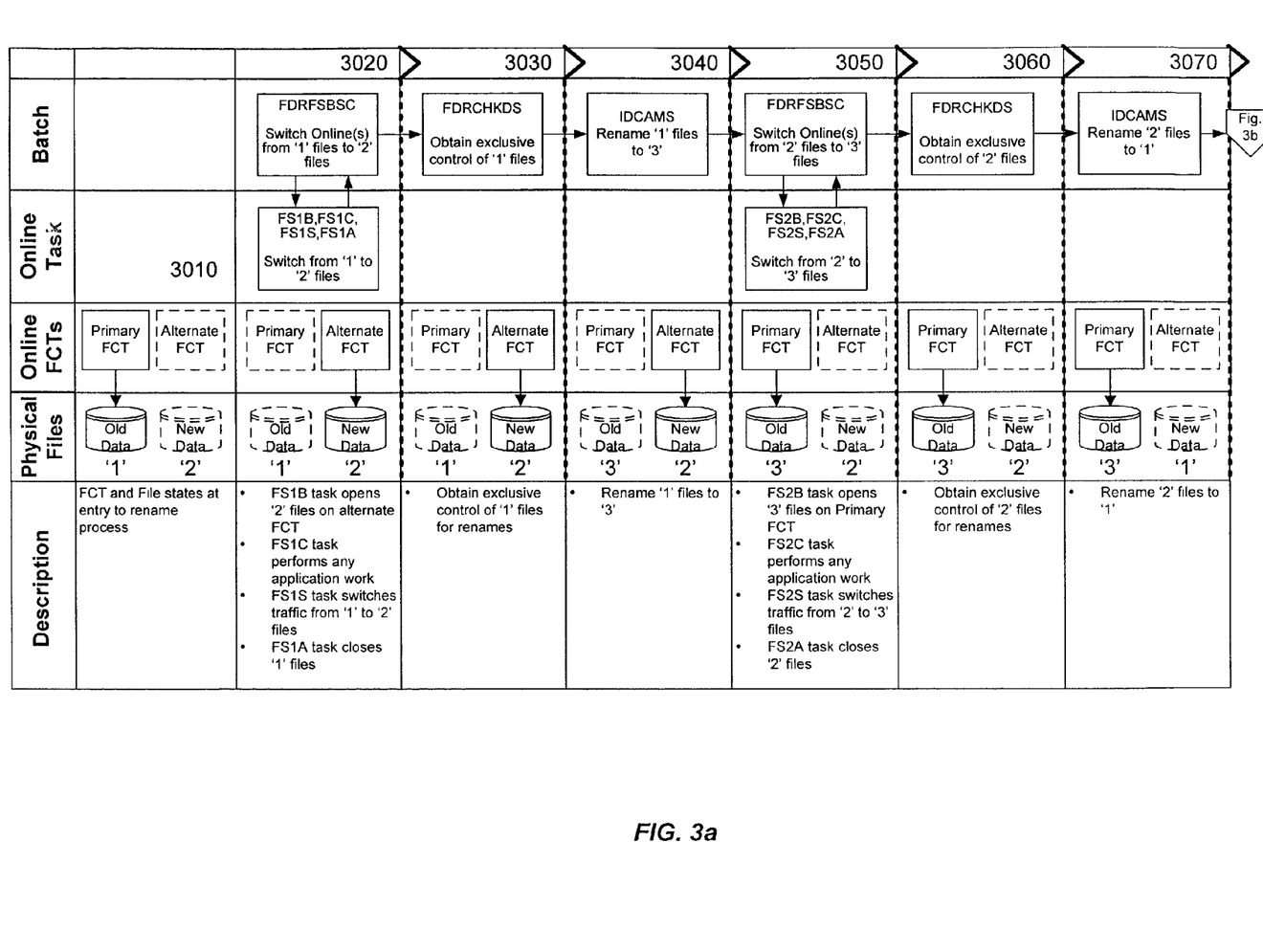
FIGS. 3a–b are simplified flow diagrams illustrating an exemplary process in accordance with the present invention.
Figure 3B:
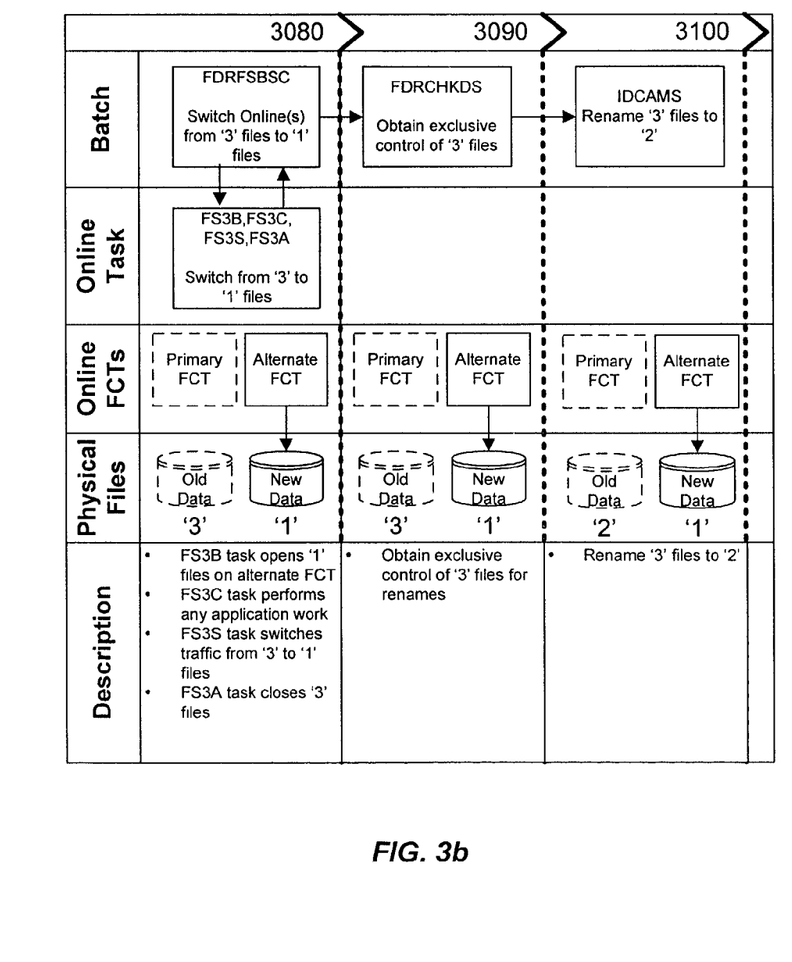

FIGS. 3a–b are simplified flow diagrams illustrating an exemplary process in accordance with the present invention. It should be understood that this exemplary process is controlled by a batch program that interacts with the online regions. As illustrated in FIG. 3a, at 3010, the '1' files are accessible to the online regions during a business day and the '2' files are built with updated information. At 3020, online traffic is switched from the '1' files to the '2' files. In other words, the '1' files are closed to the online regions and the '2' files are used by the online regions for data access. At 3030, the '1' files are locked up to prevent any further access by other batch programs. This is done to ensure that the rename operation can be successfully performed. At 3040, the '1' files are renamed to '3' to free up the '1' dataset name. For example, this step may be carried out by an IDCAMS. At 3050, the '3' files (which were the old '1' files before they were renamed) are opened and online traffic is switched from the '2' files to the '3' files. In addition, the '2' files are closed to the online regions. At 3060, the '2' files are locked up to prevent further access by other batch programs. At 3070, the '2' files are renamed to '1'. Referring to FIG. 3b, at 3080, the '1' files (which are the original '2' files before they were renamed) are opened and online traffic is switched from the '3' files to the '1' files. In other words, the '3' files are closed to the online regions and the '1' files are now used by the online regions for data access. At 3090, the '3' files are locked up to prevent further access by other batch programs. Finally, at 3100, the '3' files are renamed to '2' thereby making these files available for the batch process to build the '2' files with updated information during the next cycle. As illustrated by the exemplary process above, the availability of data to the online regions is improved during the rename process.

Figure 4A:
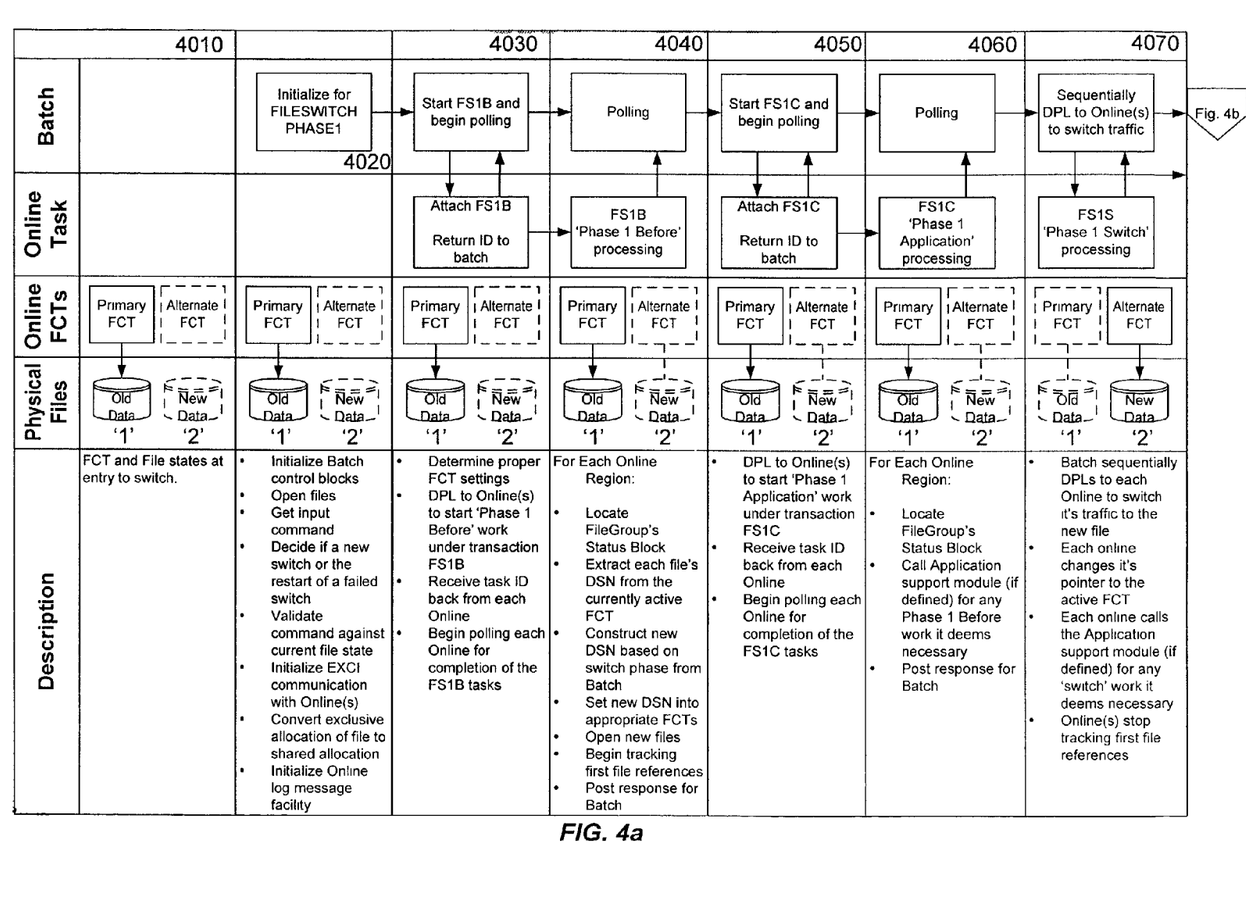

FIGS. 4a–e are simplified flow diagrams illustrating in further details the exemplary process as shown in FIG. 3. As previously mentioned, it should be understood that this exemplary process is controlled by a series of batch programs that interact with the online regions. Each batch program can be seen as representing a batch jobstep. Referring to FIG. 4a, at 4010, the '1' files containing data that need to be updated are accessible to the online regions via the primary FCT. At 4020, the first batch program or jobstep is initiated. In particular, the batch program initiates the file-switching process by initializing or starting a number of housekeeping functions. These housekeeping functions include, for example, initializing batch control blocks, opening the appropriate files, getting input commands, deciding if the file switch is new or the restart of a failed file switch, validating command against current file state, initializing EXCI communications with the online regions, converting exclusive file allocation to shared file allocation and initializing online log message facility. These housekeeping functions are carried out by the batch program so as to allow subsequent communications to be established between the batch program and the online regions. Based on the disclosure provided herein, a person of ordinary skill in the art will be able to implement these housekeeping functions in accordance with the present invention.

At 4030, the batch program begins the step of requesting an online region to allocate and open the new files containing the new data which, in this case, are the '2' files. Since there may be multiple online regions, this step is conducted in concurrent or parallel manner, i.e., the batch program concurrently requests all online regions to open the corresponding new files containing the new data. For example, some of the functions performed by the batch program to begin this request step include determining the proper FCT settings, invoking the online region to perform certain tasks with distributed program links, and receiving a task ID back from the online region. At the end of 3030, the batch program is ready to poll the online region to determine if the online region is ready to use the new files.

At 4040, the batch program begins polling each online region to determine if the online region has opened the new files. That is, the batch program determines whether the new files are available to each online region. This step continues until each online region indicates to the batch program that the new files have been opened. A number of functions are performed by each online region during this step including, for example, locating a FileGroup status block, extracting each file's DSN from the currently active FCT, constructing new DSN based on switch phase, setting new DSN into appropriate FCTs, opening new files, tracking first file references and posting response to the batch program.

Then, at 4050, the batch program begins the step of requesting an application within each online region to prepare to use the new files. Similarly, since there may be multiple online regions, the batch program concurrently makes the requests to the corresponding online regions. Some of the functions performed by the batch program during this step includes, for example, invoking the application within the online regions to perform certain tasks with distributed program links (DPLs), and receiving task IDs back from the online region. At the end of 3050, the batch program is ready to poll the online regions to determine if the application within each online region has prepared to use the new files.

At 4060, the batch program begins polling the online regions periodically to determine if the application with each online region has prepared to use the new files. At this step, preparatory functions are performed to enable the application to switch to the new files. This step continues until the application within the online region indicates to the batch program that the new files are available to the application. Some of the functions performed by each online region during this step include, for example, locating a FileGroup status block, invoking any application support modules and posting response to the batch program.

At 4070, the batch program directs the online regions to switch online traffic to the new files. From this point on, data access operations are performed using the new files subject to certain conditions. More specifically, if an application was not accessing the old files, i.e., the '1' files, before the online traffic was switched, then data operations are performed using the new files; on the other hand, if the application was accessing the old files, i.e., the '1' files, and did not have an opportunity to complete the transaction before the online traffic was switched, then additional functions are performed at 3080 and 3090 to maintain data integrity for the application. Some of the functions performed during this step include, for example, the batch program directing the online region to switch its traffic to the new files via DPLs, the online region changing its pointer to the active FCT, the online region invoking any application support modules and stopping first file references tracking.

Figure 4B:
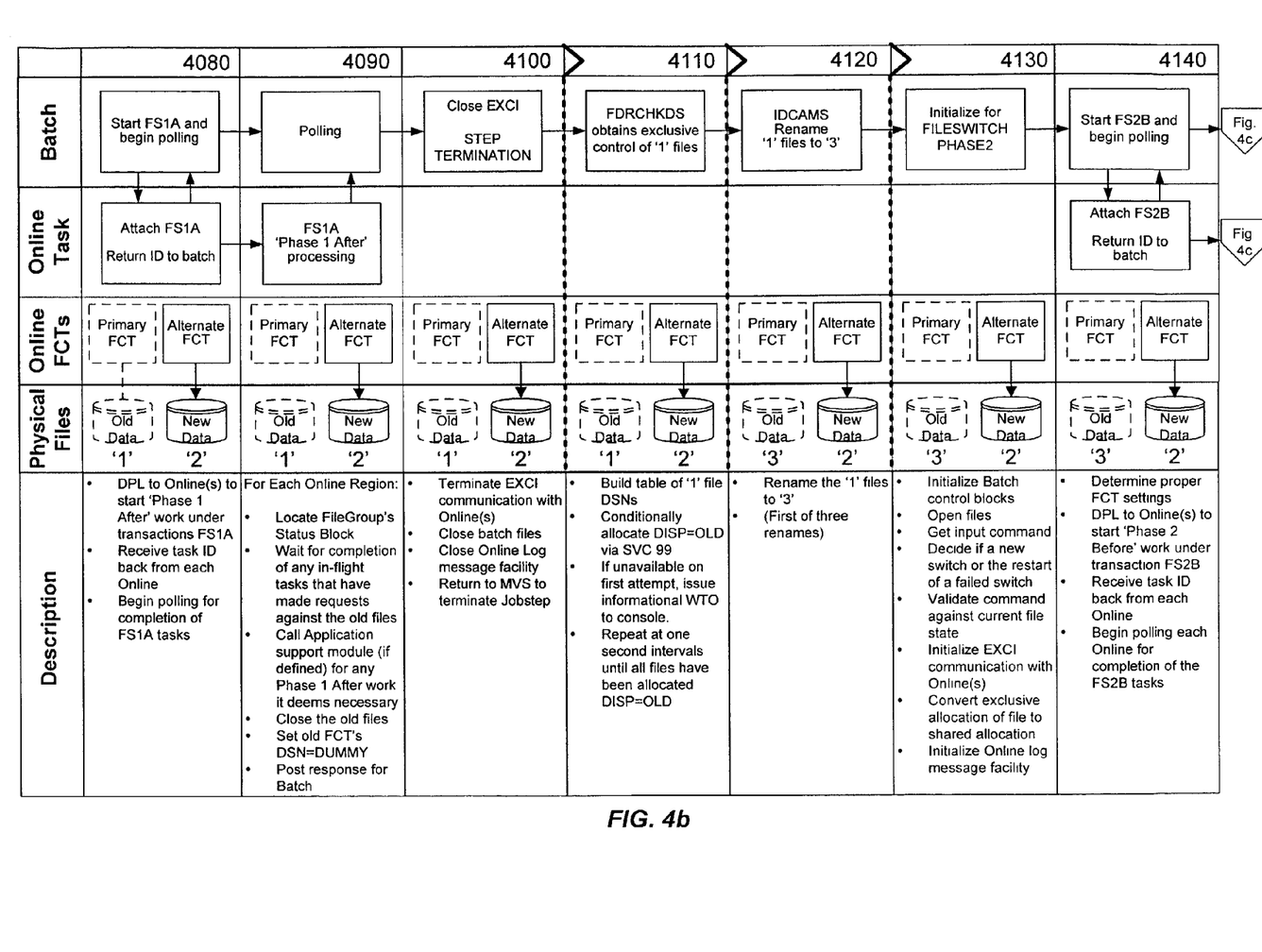
Figure 4C:
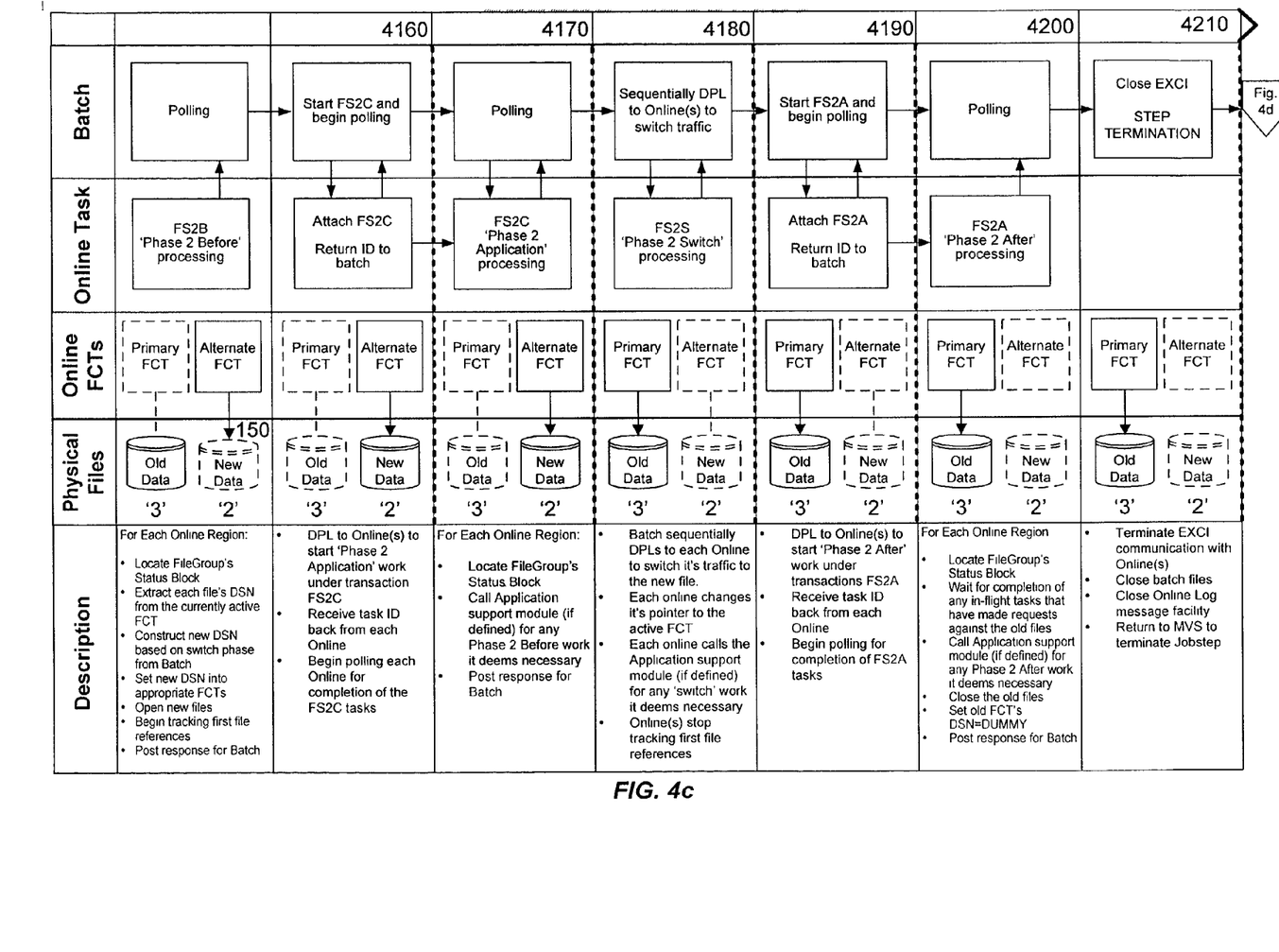

As illustrated in FIG. 4b, at 4080, the batch program causes certain functions to be performed to maintain data integrity for an application that was using the old files and did not have the opportunity to complete its transactions before the online traffic was switched. Such application is allowed to continue to use the old files until the relevant transactions are completed. Primarily, the batch program identifies the application that were in the middle of using the old files and readies the application for polling.

At 4090, the batch program begins to poll the application periodically to determine if the application has completed its transactions using the old files. Once these transactions are completed, the online region may invoke an application support module (if any) to perform any necessary cleanup functions and close and deallocate the old files. When the old files are closed, the process continues at 4100. Some of the functions performed by each online region during this step include, for example, locating the FileGroup status block, waiting for completion of any tasks that have made requests against the old file, invoking any application support module, closing the old file, setting old FCT flags and posting response to the batch program.

At 4100, the batch program terminates its communications with the online region, i.e., this jobstep is concluded. Some of the functions performed by the batch program during this step include, for example, terminating EXCI communications, closing batch files, closing online log message facility and returning to MVS to terminate jobstep.

At 4110, a second batch program or jobstep is initiated. The purpose of this jobstep is to ensure that no online region or batch program has access to the old files, i.e., the '1' files. In other words, the batch program obtains exclusive control of the old files to make sure no other batch program is able to use the old files, which would cause the rename operation to fail. Program(s) that are currently using the old files are allowed to complete their execution but other program(s) are prevented from initiating execution which requires access to the old files. Some of the functions performed by the batch program during this step include, for example, building a table of '1' files DSNs and allocating all files appropriately.

At 4120, a third batch program or jobstep is initiated. The purpose of this jobstep is to rename the '1' files to a '3' files, i.e., the old files are renamed to an intermediate file. This is the first of three rename operations that take place during the exemplary process. This step can be carried out by, for example, IDCAMS.

Once step at 4120 is concluded, another batch program or jobstep is initiated to switch the online traffic from the '2' files to the '3' files. The steps from 4130 through 4210 are similar to the steps 4020 to 4100 as described above.

Figure 4D:
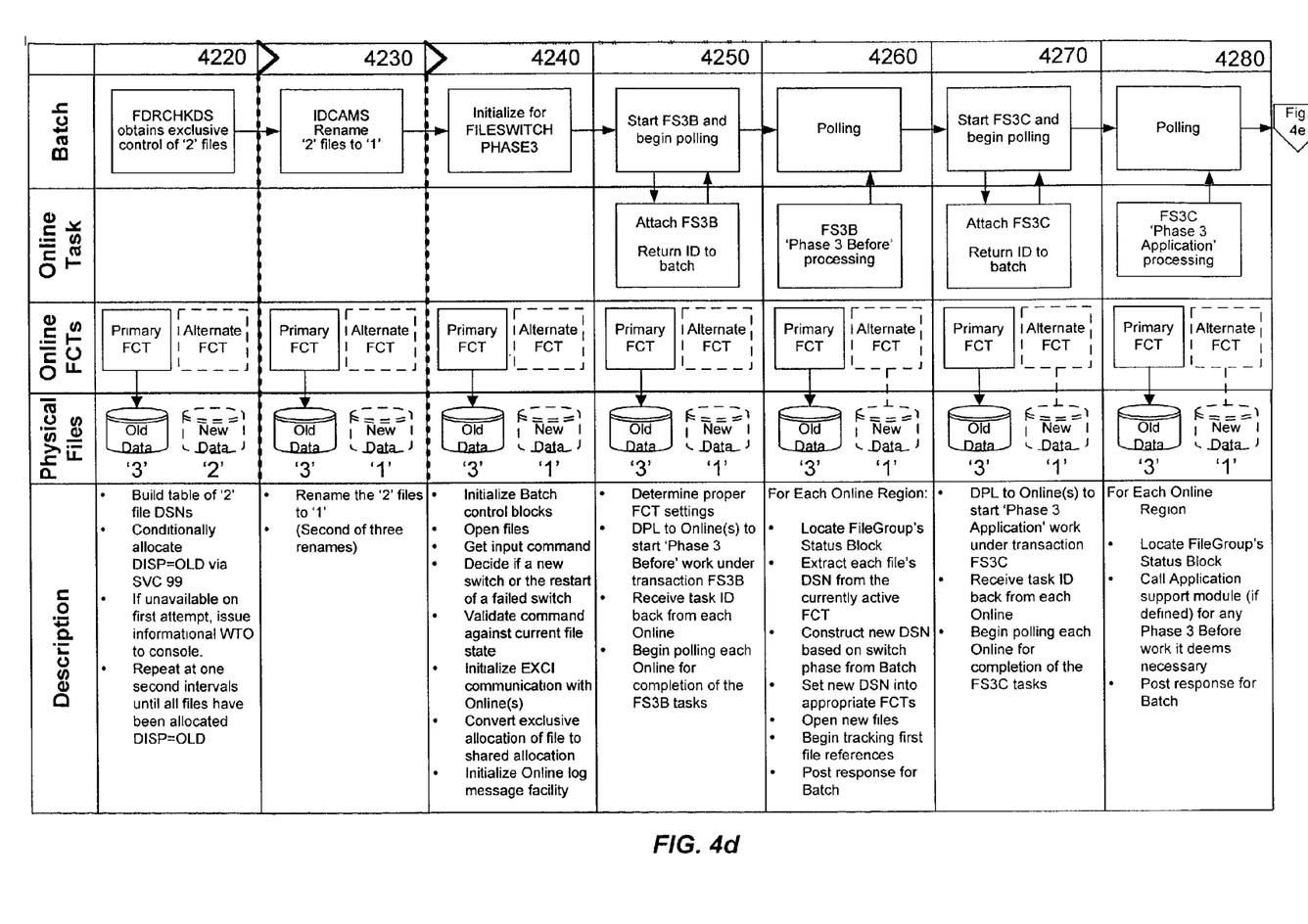

When the steps 4130 through 4210 are finished as illustrated in FIGS. 4*a*–*b*, at 4220 as shown in FIG. 4*d*, another batch program or jobstep is initiated to obtain exclusive control of the '2' files. This is similar to the step 4110 described above.

At 4230, the next batch program or jobstep is initiated to rename the '2' files to the '1' files. This is the second of three rename operations.

Then, another batch program or jobstep as represented by steps 4240 through 4320 is executed to switch the online traffic from the '3' files to the '1' files which contain the new data.

When the steps 4240 through 4320 are finished as illustrated in FIGS. 4*d*–*e*, at 4330 as shown in FIG. 4*e*, the next batch program or jobstep is started to obtain exclusive control of the '3' files. This is similar to steps 4110 and 4220 described above.

At 4340, the next batch program or jobstep is initiated to rename the '3' files to the '2' files. This is the last of three rename operations. Upon completion this last rename operation, the exemplary process is concluded.

Figure 5:
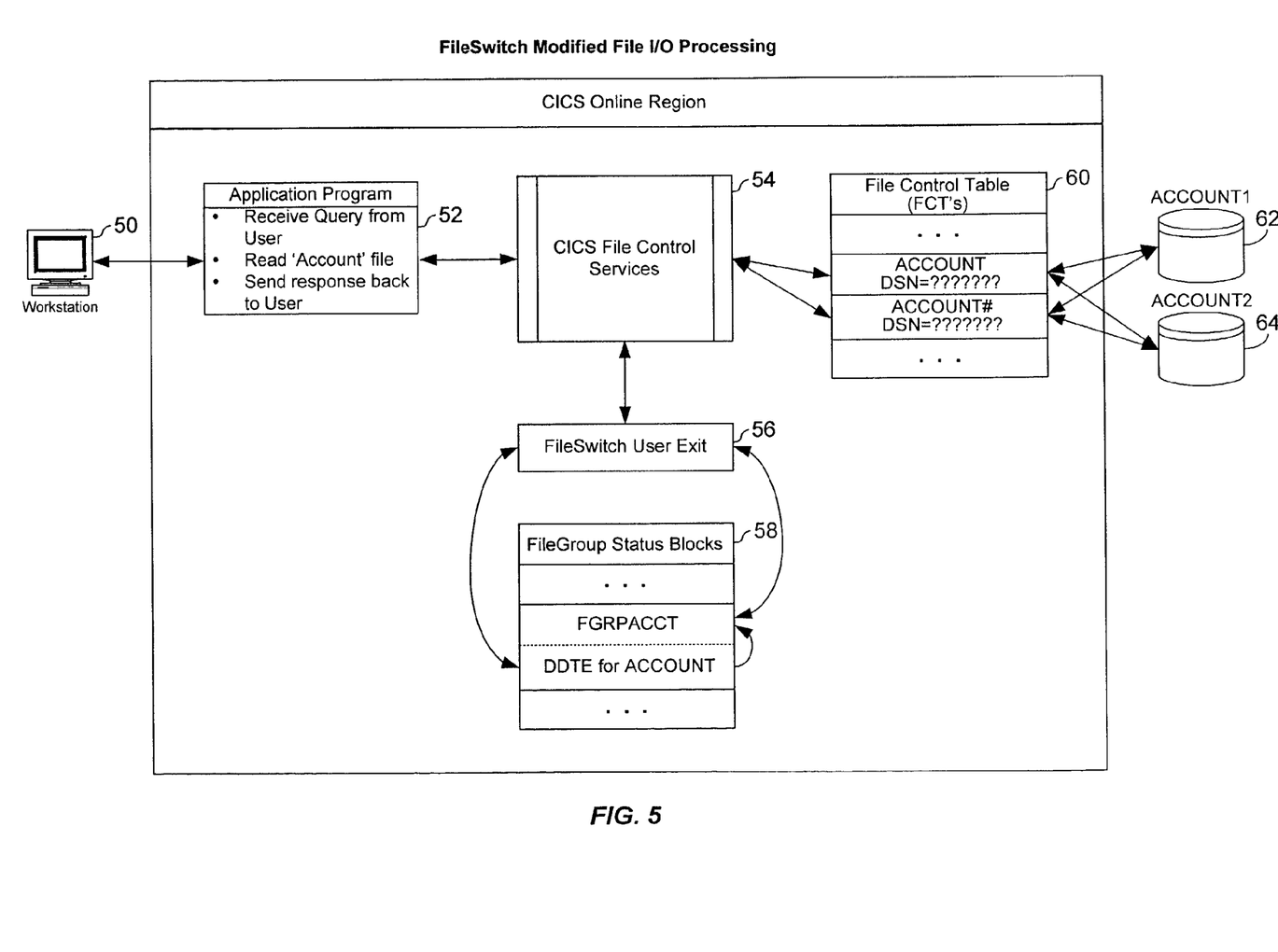
FIG. 5 is a simplified block diagram illustrating the input/output process of an online region in accordance with the present invention.

FIG. 5 illustrates the input/output processing of an exemplary embodiment of an online region in accordance with the present invention. This exemplary embodiment is implemented using CICS. Referring to FIG. 5, a workstation 50 sends a request to an application program 52 within the online region to retrieve a specified record within a file named "ACCOUNT". The application program 52, in turn, issues a file control request to a CICS file control 54 to ask the CICS file control to read the specified record from the FCT named "ACCOUNT". Upon receiving the file control request, the CICS file control 54 invokes a user exit function 56. In CICS, the user exit function 56 is available to implement or carry out customized functions. In this instance, the user exit function 56 is used to modify the file control request (if needed) before the request is processed by CICS. More specifically, the user program locates the FileGroup Status Block DDNAME Table Entry (DDTE) for the FCT named "ACCOUNT". The user program then alters the FCT name that the CICS file control 54 is to use based on information contained in the FileGroup's Status Block and the FCT's DDTE and returns the altered FCT name to the CICS file control 54. The altered FCT name is associated with the file that contains the new data. The CICS file control 54 locates the altered FCT name returned from the user program via the user exit function 56. Using the altered FCT name, the CICS file control 54 reads the specified record from the file associated with the altered FCT name. The CICS file control 54 then returns the specified record to the application program 52 which, in turn, forwards the record to the workstation 50. By altering the FCT name which the CICS file control 54 is to use, the user program effectively performs a file switch thereby directing access to the new data.

Figure 6:
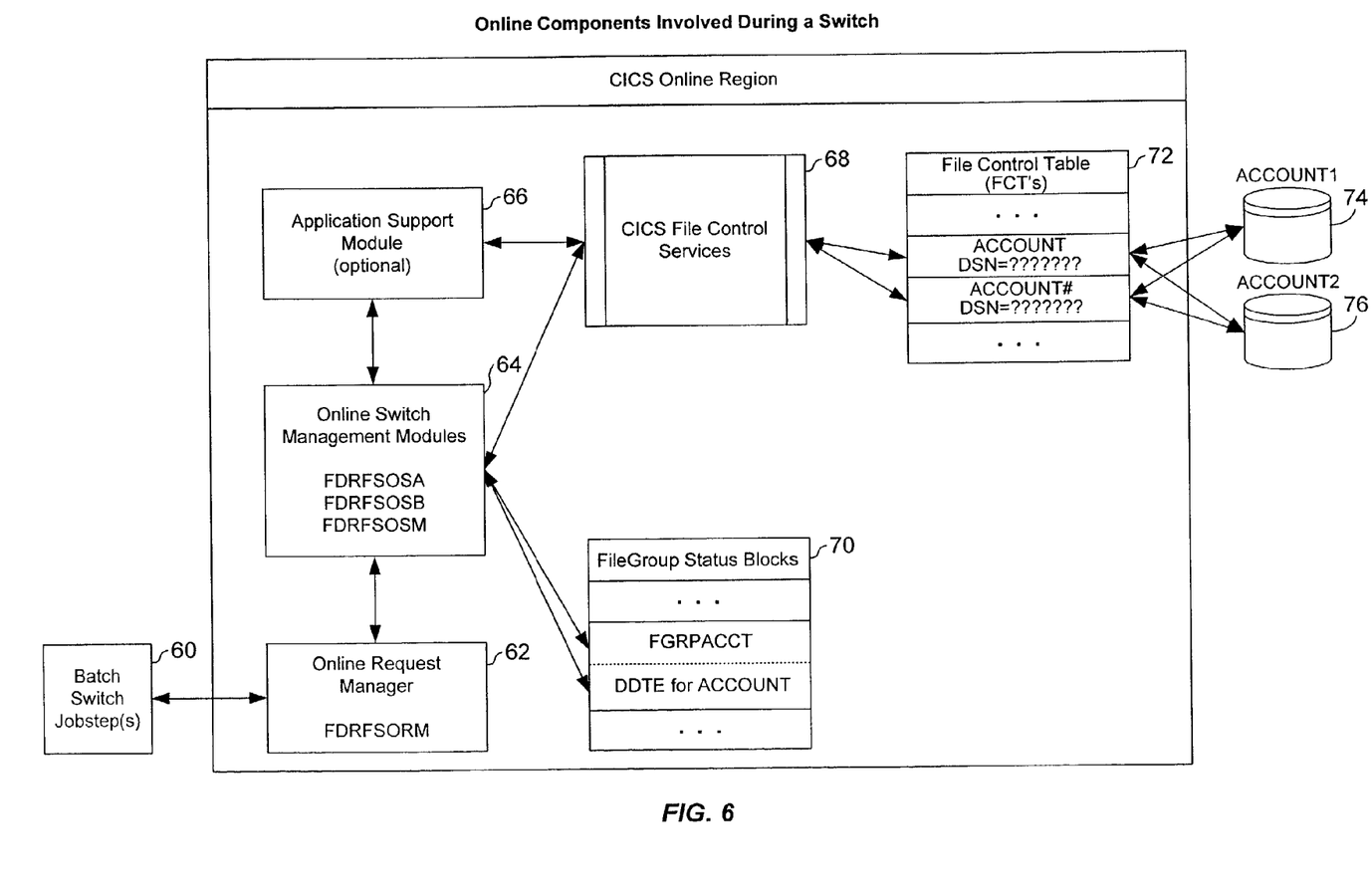
FIG. 6 is a simplified block diagram illustrating the interactions between various components of an exemplary embodiment of an online region during execution of an exemplary process in accordance with the present invention.

FIG. 6 illustrates the interactions between various components of an exemplary embodiment of an online region during execution of an exemplary process in accordance with the present invention. This exemplary embodiment is also implemented using CICS. As described above, a number of batch programs are used during the exemplary process of the present invention. Referring to FIG. 6, each batch program 60 interacts with an online request manager 62. The batch program 60 is capable of issuing different types of requests to the online request manager 62. For all request types, the batch program 60 communicates with the online request manager via EXCI DPL calls. For any request type that is initiated due to actions by the online region, the online request manager 62 starts a separate task to process the request (to allow the requests to run in parallel in each online region involved in the file-switching process). The online request manager 62 then passes the requests to online switch management modules 64 for further processing.

For FS*B requests, i.e., requests sent during initiation of polling of online regions as described above in steps 3030, 3140 and 3250, the online switch management modules 64 instruct the CICS file control 68 to allocate and open the 'new' files. The new file's dataset names and which FCTs to use are derived from information in the FileGroup's Status Block.

For FS*C requests, i.e., requests sent during initiation of polling of applications in online regions as described in steps 3050, 3160 and 3270, the online switch management modules 64 call the application support module(s) (if any) associated with the FileGroup (if any) to perform any work that may be necessary in preparation for using the new files.

For FS*S requests, i.e., requests sent during file switching as described above in steps 3070, 3180 and 3290, the online switch management modules 64 alter the FileGroup's Status Block and DDNAME tables to switch the online traffic on to the new files. The online switch management modules 64 then call the application support module 66 (if any) to complete any work that may be necessary before beginning to use the new files.

For FS*A requests, i.e., requests sent to maintain data integrity and consistency as described above in steps 3080, 3190 and 3300, the online switch management modules 64 wait for any application task that has already used any of the old files in the FileGroup to complete (to maintain data integrity and data consistency). Once completed, the online switch management modules 64 call the application support module(s) (if any) for any necessary cleanup work and then instruct the CICS file control 68 to close and deallocate the 'old' files.

For all requests types, the FileGroup's Status Block and DDNAME tables are updated at each step in the process to reflect the changes being made.

In an exemplary embodiment, the present invention can be implemented using assembly language or assembler code. It will be appreciated by a person of ordinary skill in the art that the present invention can be implemented in the form of control logic or batch jobsteps using various types of software or computer programming languages, in an integrated or modular manner.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for enhancing VSAM files online availability, comprising:
    switching online traffic from a first group of files to a second group of files, wherein the first group of files is identified by a first name and the second group of files is identified by a second name, and the first group of files identified by the first name contain old data and the second group of files identified by the second name contain new data;
    obtaining exclusive control of the first group of files;
    renaming the first group of files from the first name to a third name, during which online traffic accesses the second group of files;
    switching online traffic from the second group of files to the first group of files currently identified by the third name;
    obtaining exclusive control of the second group of files;
    renaming the second group of files from the second name to the first name, during which online traffic accesses the first group of files;
    switching online traffic from the first group of files currently identified by the third name to the second group of files currently identified by the first name;
    obtaining exclusive control of the first group of files currently identified by the third name; and
    renaming the first group of files currently identified by the third name to the second name, during which online traffic accesses the second group of files;
    whereby at least one of the first and second groups of files is available for online traffic during each of the renaming steps.

2. The method of claim 1 further comprising:
    after renaming the first group of files currently identified by the third name to the second name, using the first group of files currently identified by the second name to store updated data.

3. The method of claim 1 wherein switching online traffic from the first group of files identified by the first name to the second group of files identified by the second name further comprises:
    opening the second group of files identified by the second name;
    preparing an application to use the second group of files identified by the second name;
    switching the application to use the second group of files identified by the second name from the first group of files identified by the first name; and
    closing the first group of files identified by the first name.

4. The method of claim 1 wherein switching online traffic from the second group of files identified by the second name to the first group of files currently identified by the third name further comprises:
    opening the first group of files currently identified by the third name;
    preparing the application to use the first group of files currently identified by the third name;
    switching the application to use the first group of files identified by the third name from the second group of files identified by the second name; and
    closing the second group of files identified by the second name.

5. The method of claim 1 wherein switching online traffic from the first group of files currently identified by the third name to second group of files currently identified by the first name further comprises:
    opening the second group of files currently identified by the first name;
    preparing the application to use the second group of files currently identified by the first name;
    switching the application to use the second group of files identified by the first name from the first group of files identified by the third name; and
    closing the first group of files identified by the third name.

6. The method of claim 1 implemented using a plurality of batch programs in cooperation with a CICS region.

7. A method for enhancing VSAM files online availability to online regions, comprising:
    directing an online region to switch data access from a primary group of files identified by a first label to an alternate group of files identified by a second label, the primary group of files identified by the first label containing old data and the alternate group of files identified by the second label containing new data;
    locking up the primary group of files;
    renaming the primary group of files from the first label to a third label, during which the alternate group of files is open to the online region;
    directing the online region to switch data access from the alternate group of files to the primary group of files currently identified by the third label;
    locking up the alternate group of files;
    renaming the alternate group of files from the second label to the first label, during which the primary group of files is open to the online region;
    directing the online region to switch data access from the primary group of files currently identified by the third label to the alternate group of files currently identified by the first label;

locking up the primary group of files currently identified by the third label; and renaming the primary group of files currently identified by the third label to the second label, during which the alternate group of files is open to the online region;

whereby at least one of the primary and alternate groups of files is open to online regions during each of the renaming steps.

8. The method of claim 7 further comprising:

after renaming the primary group of files currently identified by the third label to the second label, using the primary group of files currently identified by the second label to store updated data.

9. The method of claim 7 wherein directing the online region to switch data access from the primary group of files identified by the first label to the alternate group of files identified by the second label further comprises:

opening the alternate group of files identified by the second label;

preparing an application within the online region to use the alternate group of files identified by the second label;

switching the application to use the alternate group of files identified by the second label from the primary group of files identified by the first label; and closing the primary group of files identified by the first label.

10. The method of claim 7 wherein directing the online region to switch data access from the alternate group of files to the primary group of files currently identified by the third label further comprises:

opening the primary group of files currently identified by the third label;

preparing an application within the online region to use the primary group of files currently identified by the third label;

switching the application to use the primary group of files identified by the third label from the alternate group of files identified by the second label; and closing the alternate group of files identified by the second label.

11. The method of claim 7 wherein directing the online region to switch data access from the primary group of files currently identified by the third label to the alternate group of files currently identified by the first label further comprises:

opening the alternate group of files currently identified by the first label;

preparing the application to use the alternate group of files currently identified by the first label;

switching the application to use the alternate group of files identified by the first label from the primary group of files identified by the third label; and closing the primary group of files identified by the third label.

12. The method of claim 7 implemented using a plurality of batch programs in cooperation with a CICS region.

13. A system for enhancing VSAM files online availability, comprising:

a batch program configured to switch online traffic from a first group of files to a second group of files, wherein the first group of files is identified by a first name and the second group of files is identified by a second name, and the first group of files identified by the first name contain old data and the second group of files identified by the second name contain new data;

a batch program configured to obtain exclusive control of the first group of files;

a batch program configured to rename the first group of files from the first name to a third name, during which online traffic accesses the second group of files;

a batch program configured to switch online traffic from the second group of files to the first group of files currently identified by the third name;

a batch program configured to obtain exclusive control of the second group of files;

a batch program configured to rename the second group of files from the second name to the first name, during which online traffic accesses the first group of files;

a batch program configured to switch online traffic from the first group of files currently identified by the third name to second group of files currently identified by the first name;

a batch program configured to obtain exclusive control of the first group of files currently identified by the third name; and a batch program configured to rename the first group of files currently identified by the third name to the second name, during which online traffic accesses the second group fo files;

whereby at least one of the first and second groups of files is available for online traffic during each renaming of the files.

14. The system of claim 13 wherein the batch program configured to switch online traffic from the first group of files identified by the first name to the second group of files identified by the second name is further configured to:

open the second group of files identified by the second name;

prepare an application to use the second group of files identified by the second name;

switch the application to use the second group of files identified by the second name from the first group of files identified by the first name; and close the first group of files identified by the first name.

15. The system of claim 13 wherein the batch program configured to switch online traffic from the second group of files identified by the second name to the first group of files currently identified by the third name is further configured to:

open the first group of files currently identified by the third name;

prepare the application to use the first group of files currently identified by the third name;

switch the application to use the first group of files identified by the third name from the second group of files identified by the second name; and close the second group of files identified by the second name.

16. The system of claim 13 wherein the batch program configured to switch online traffic from the first group of files currently identified by the third name to second group of files currently identified by the first name is further configured to:

open the second group of files currently identified by the first name;

prepare the application to use the second group of files currently identified by the first name;

switch the application to use the second group of files identified by the first name from the first group of files identified by the third name; and close the first group of files identified by the third name.

17. The system of claim 13 further comprising:
a batch program configured to store updated data using the first group of files currently identified by the second name after the first group of files is renamed from the third name to the second name.

18. A system for enhancing VSAM files online availability, comprising:
a first batch program configured to issue a plurality of requests, each of the plurality of requests belonging to one of a first request type, a second request type, a third request type and a fourth request;
an online region comprising:
an online request manager configured to receive the plurality of requests received from the first batch program;
an online switch management module configured to interact with the online request manager and process the plurality of requests; and
a file control module configured to interact with the online switch management module;
wherein a request of the first request type is used to direct the file control module to open a group of new files;
wherein a request of the second request type is used to prepare the online region to use the group of new files;
wherein a request of the third request type is used to direct the online region to switch data access from a group of old files to the group of new files; and
wherein a request of the fourth request type is used to maintain data integrity between the group of old files and the group of new files and direct the file control module to close the group of old files;
a second batch program configured to secure exclusive control of a group of files; and
a third batch program configured to rename a group of files;
wherein the first batch program, the second batch program and the third batch program collectively execute a file switch process between the old group of files and the new group of files; and
wherein at least one of the groups of old and new files remains available for online access when either of the groups of files is renamed.

19. The system of claim 18 wherein the file switch process is executed as follows:

the first batch program sequentially issues the request of the first request type, the request of the second request type, the request of the third request and the request of the fourth request type to direct the online region to switch data access from the group of old files having a first dataset name to the group of new files having a second dataset name;
the second batch program obtains exclusive control of the group of old files having the first dataset name;
the third batch program renames the group of old files having the first dataset name to a third dataset name;
the first batch program sequentially issues the request of the first request type, the request of the second request type, the request of the third request and the request of the fourth request type to direct the online region to switch data access from the group of new files having the second dataset name to the group of old files currently having the third dataset name;
the second batch program obtains exclusive control of the group of new files having the second dataset name;
the third batch program renames the group of new files currently having the second dataset name to the first dataset name;
the first batch program sequentially issues the request of the first request type, the request of the second request type, the request of the third request and the request of the fourth request type to direct the online region to switch data access from the group of old files currently having the third dataset name to the group of new files currently having the first dataset name;
the second batch program obtains exclusive control of the group of old files having the third dataset name; and
the third batch program renames the group of old files currently having the third dataset name to the second dataset name.

20. The system of claim 19 further comprising:
a fourth batch program configured to store updated data using the group of old files currently having the second dataset name after the third batch program renames the group of old files from the third dataset name to the second dataset name.

* * * * *